United States Patent [19]
Bevilacqua

[11] 3,959,071
[45] May 25, 1976

[54] METHOD AND APPARATUS FOR A NUCLEAR REACTOR FOR INCREASING RELIABILITY TO SCRAM CONTROL ELEMENTS

[75] Inventor: Frank Bevilacqua, Windsor, Conn.
[73] Assignee: Combustion Engineering, Inc., Windsor, Conn.
[22] Filed: May 28, 1974
[21] Appl. No.: 473,606

[52] U.S. Cl. .................................. 176/36 R; 310/14
[51] Int. Cl.² .......................................... G21C 7/08
[58] Field of Search .......................... 176/36; 310/14

[56] References Cited
UNITED STATES PATENTS
| | | | |
|---|---|---|---|
| 3,524,924 | 8/1970 | Germer .............................. | 176/36 R |
| 3,607,629 | 9/1971 | Frisch et al. ....................... | 176/36 R |

Primary Examiner—Samuel Feinberg

[57] ABSTRACT

A method and apparatus for increasing the reliability of linear drive devices of a nuclear reactor to scram the control elements held in a raised position thereby. Each of the plurality of linear drive devices includes a first type of holding means associated with the drive means of the linear drive device and a second type of holding means distinct and operatively dissimilar from the first type. The system of linear drive devices having both types of holding means are operated in such a manner that the control elements of a portion of the linear drive devices are only held in a raised position by the first holding means and the control elements of the remaining portion of linear drive devices are held in a raised position by only the second type of holding means. Since the two types of holding means are distinct from one another and are operatively dissimilar, the probability of failure of both systems to scram as a result of common mode failure will be minimized. Means may be provided to positively detect disengagement of the first type of holding means and engagement of the second type of holding means for those linear drive devices being operative to hold the control elements in a raised position with the second type of holding means.

19 Claims, 4 Drawing Figures

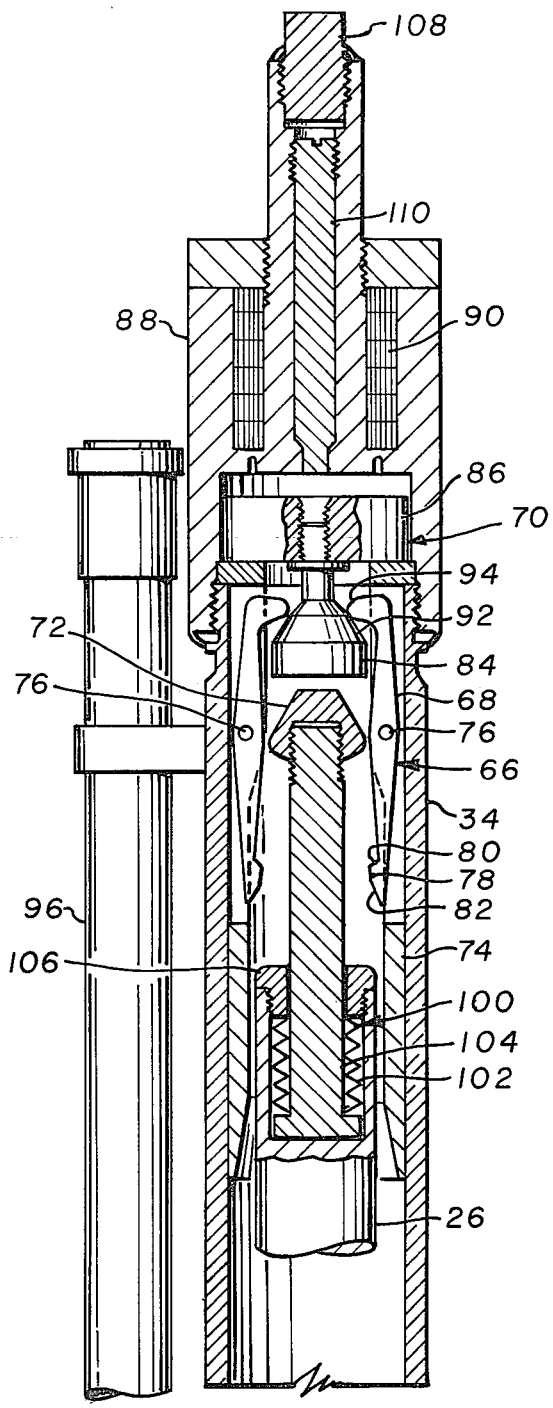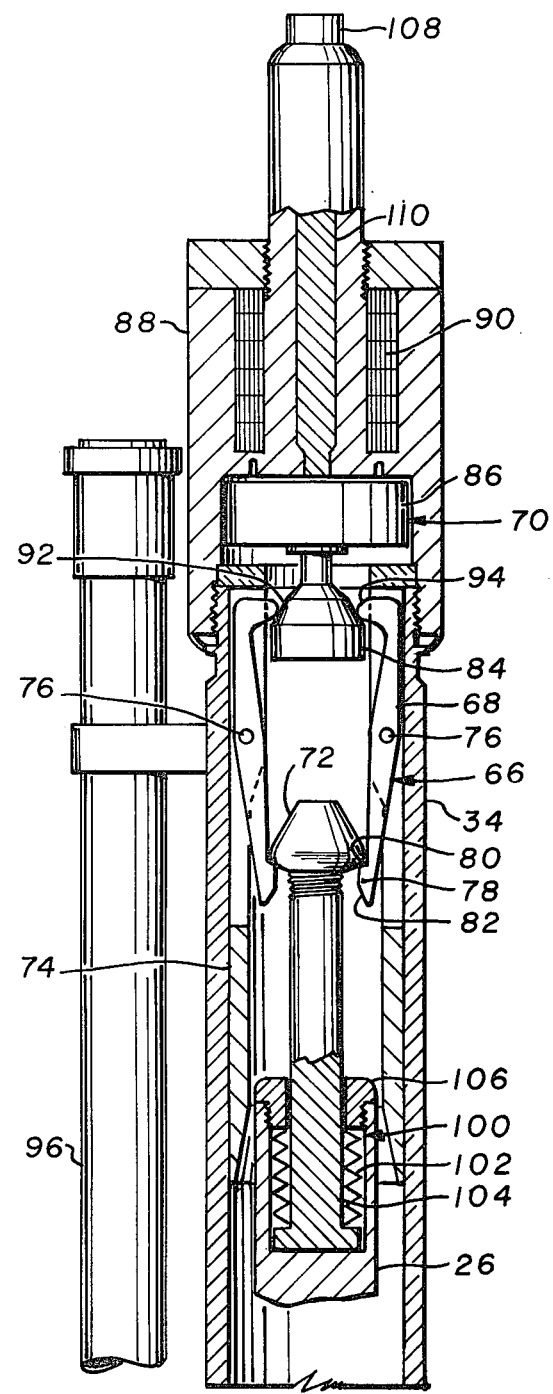
FIG. 3
FIG. 4

METHOD AND APPARATUS FOR A NUCLEAR REACTOR FOR INCREASING RELIABILITY TO SCRAM CONTROL ELEMENTS

BACKGROUND OF THE INVENTION

This invention relates to linear drive devices for nuclear reactors and more particularly to a drive device and method of operation for increasing reliability to scram control elements into the core of the nuclear reactor.

A generally recognized method of controlling a nuclear reactor involves the use of a plurality of longitudinally movable control elements. The control elements are made of or contain a neutron absorbing material and act to regulate and control the nuclear chain reaction within the core depending on the longitudinal position of the control element relative to the core. Changes in the longitudinal position of the control elements are generally effected by linear drive devices mounted on the reactor vessel head and coupled to drive extensions of the control elements. For safety considerations, these linear drive devices must be capable of rapidly inserting (scramming) the control elements into the core to stop the nuclear chain reaction in the event of an emergency situation to prevent possible concomitant damage to the reactor and surroundings.

In the past this rapid insertion of the control elements has been accomplished by providing means associated with the linear drive device for releasing the control elements to fall freely under the influence of gravity into the nuclear core to shutdown the reactor. In particular, with magnetic jacking type drives having gripper assemblies for engaging the control element drive extension and electromagnetic coils for actuating and de-actuating the gripper assemblies, this release to scram has been accomplished by de-energizing the magnetic coils to effect disengagement of the gripper assemblies from the control element extension. Such devices have proven highly reliable in effecting a scram of the nuclear reactor.

However, the Atomic Energy Commission in a report released in September, 1973, entitled "Technical Report On Anticipated Transients Without Scram For Water-Cooled Power Reactors" and placed in the AEC's public document room, has recently stated that it would be appropriate for the nuclear industry to take reasonable steps to upgrade these reliable systems as the nuclear industry matures. The main area of concern revolves around common mode failure to scram. Common mode failure problems arise when several items are built mechanically and operate mechanically in the same way. With such devices, there is a probability, although slight, that all identical devices can fail upon the occurrence of a single event. More specifically with reference to failure to scram, there is concern that all the control element linear drive devices, such as magnetic jacks, will not function properly in the event of a scram situation to release the control elements. One suggestion for upgrading the reliability is to provide two separate shutdown or scram systems, each of which operates independently and includes different equipment from the other.

While providing two separate shutdown systems would decrease the probability of failure to scram as a result of anticipated transient (anticipated transients relate to events which are expected to occur at least once during the life of the reactor and therefore are not considered to be hypothetical accident situations), it would also significantly increase the cost of providing a nuclear power generating system. For example, it would necessarily mean increased costs in development and manufacture of a new and independent design. Furthermore, with a control element drive system using two different control element drives, it would be difficult to vary the control element management scheme so as to follow changes in fuel management.

SUMMARY OF THE INVENTION

Accordingly there is provided an economical means for increasing the reliability to scram of the linear drive devices which control and regulate the control elements of the nuclear reactor. The present invention contemplates providing each of the linear drive devices with a second type of holding means which is adapted to hold the control element associated therewith in a raised position and in a condition ready to scram. The second holding means are different from and in adition to the drive means and first holding means of the linear drive devices. With such a system a linear drive devices for a nuclear reactor, a portion of the linear drive devices are operated using only the first holding means to hold the control elements associated therewith in a raised or partially raised position and the remaining portion of drive devices are operated using only the second holding means to hold the remaining control elements in a raised position. Since each of the first and second type of holding means are different and operate differently from one another, there is less probability that a single event can cause failure of both types of holding means to release and thereby preventing the scram of the control elements for all of the linear drive devices of the nuclear reactor. Thus the probability that at least one of the systems will scram is markedly increased.

In the preferred embodiment, the method of operating the linear drive devices to increase reliability to scram involves first raising and holding the control elements using the drive means and first holding means for each of the linear drive devices. Then, for a first portion of the linear drive devices, the control elements associated therewith are further raised, the second holding means actuated, and the first holding means de-actuated to place the control elements in engagement with the second holding means of the portion of linear drive devices. De-actuation and disengagement of the first holding means of the first portion of linear drive devices is then detected to ensure that the first holding means will not interfere with the release of the control elements by the second holding means to scram the control elements into the nuclear core. In the preferred embodiment this detection is accomplished by verifying that downward motion of the element occurred prior to its arrest by the second holding means.

Also in the preferred embodiment, the linear drive devices of the present invention comprise a magnetic jack type drive having a second type of holding means which is operative to engage and hold the control element drive extension in a fully withdrawn position with respect to the nuclear core. The drive means of the magnetic jack is operative to raise the control elements to a longitudinal position above its engaging position with the second holding means whereupon the second holding means can be actuated and the first holding means and drive means de-actuated to allow the control element drive extension to fall into engagement with the second holding means. Means are provided for detecting this limited downward movement of the control elements into engagement with the second holding means to positively indicate that the first holding means and drive means are disengaged and that the second holding means is engaged with the control element.

Accordingly, with use of the present invention in which a portion of the linear drive devices are operative to hold control elements in a raised position by a first holding means and the remaining portion of linear drive devices are operative to hold the control elements in a raised position by the second holding means, the probability of scramming at least one set of control elements in any situation will be increased and the problem of common mode failure to scram will be minimized. Furthermore by providing each magnetic jacking type drive device with both types of independent holding means, each of the linear drive devices of the nuclear reactor can be continuously tested to ensure that they will release the control elements in a scram situation. Further still, flexibility of selection of which type of holding means will be used for which control elements may be achieved. Also control element management (in other words which control elements will be designated for "control" and which control elements will be designated for "shutdown") can be easily changed to follow fuel management schemes as they change and are varied during the life of the reactor.

BRIEF DESCRIPTION OF THE DRAWINGS

FIG. 3 is an enlarged sectional side elevation of the upper portion of the drive device shown in FIG. 2, the control element drive extension being shown in a raised position above its engaging position with the second type of holding means and the second type of holding means being shown in a de-actuated or non-engaging state; and FIG. 4 is a view similar to that shown in FIG. 3 but with the control element drive extension being engaged and held by the second type of holding means.

DESCRIPTION OF THE PREFERRED EMBODIMENT

Figure 1:
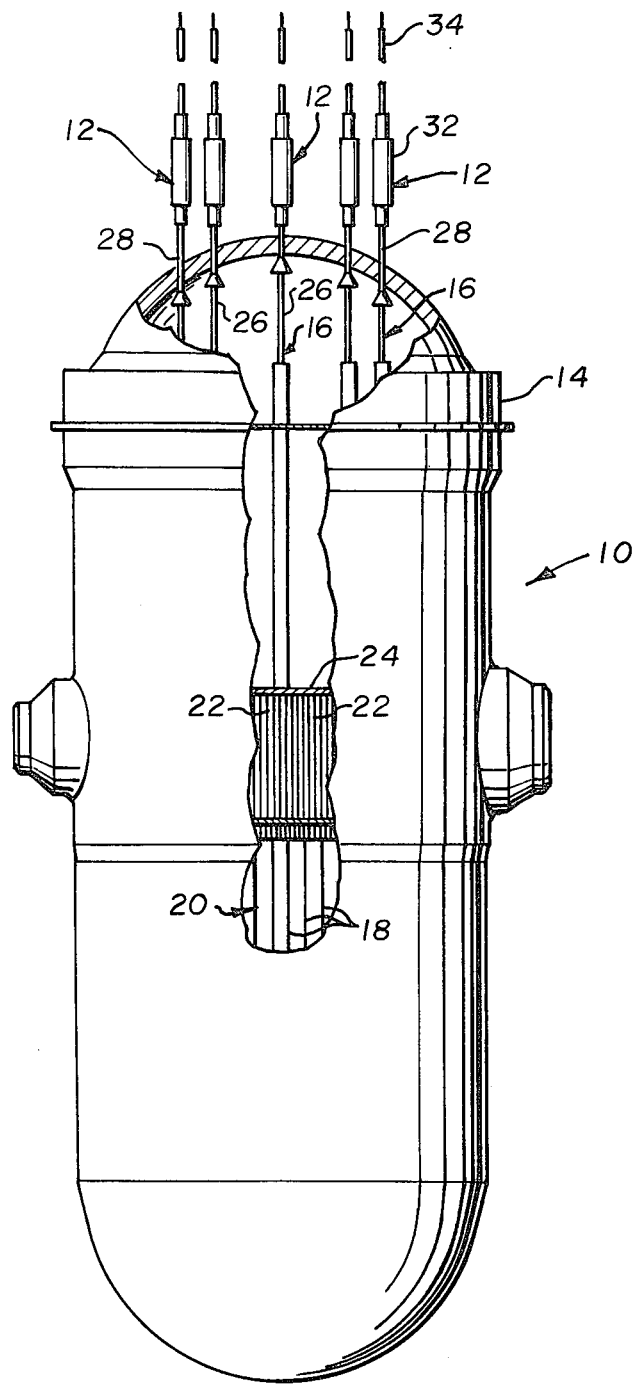
FIG. 1 is an elevational view partly in section of a nuclear reactor embodying the present invention in which a plurality of linear drive devices for control elements are mounted on the vessel head.

Referring now to the drawings, FIG. 1 shows generally a nuclear reactor vessel 10 having a plurality of linear drive devices 12 mounted on the vessel head 14 thereof for controlling the longitudinal position of control elements 16 within the vessel. As more fully described in co-pending application Ser. No. 266,858 entitled "Guide Structure For Control Elements" by Frank Bevilacqua filed June 28, 1972, the control elements may comprise rods (not shown) of a neutron absorbing material which are adapted for longitudinal movement within guide channels (not shown) in fuel assemblies 18 forming the nuclear core 20. The rods pass through tubes 22 of the upper guide structure 24 which serves to align the upper ends of the fuel assemblies 18. In the preferred embodiment groups of rods are ganged together at their upper ends above the upper guide structure 24 and each group of ganged rods is connected to a control element drive extension 26 which extends upward and passes through a nozzle 28 in the reactor vessel head 14. The linear drive devices 12 are mounted to the nozzle 28 and have means associated therewith for engaging the drive extension 26 to control raising and lowering of the control elements 16. The relative longitudinal position of the control elements 16 with respect to the fuel assemblies 18 in turn controls the nuclear fissioning within the core 20. For example, upward movement withdraws the control elements 16 from the core 20 and increases the power output thereof while downward movement inserts the control elements 16 and decreases the power output. Shutdown of the reactor is achieved by fully inserting the control elements 16 into the core 20.

Generally, for safety considerations and to increase the shutdown capability, the number and neutron absorbing strength of the individual control elements 16 are in excess of that required or necessary to adequately shutdown the reactor. During normal reactor operation, only a portion of the control elements 16 within the reactor 10 are used for regulating the power output of the core 20, and the remaining portion of the control elements 16 are maintained in a fully withdrawn position and in condition to effect a scram or rapid shutdown of the reactor should such become necessary. Those control elements 16 which control the power output of the core 20 are known as "regulating" control elements while those control elements 16 which are maintained during normal reactor operation in a fully withdrawn position are known as "shutdown" or safety control elements. In the event of a situation calling for scramming of the reactor, both the regulating and shutdown control elements are inserted into the core 20.

Although the present invention is disclosed and described with reference to shutdown type control elements, this is not meant to be limiting on the use of the present invention as it is equally applicable to both types of control elements. Furthermore, practice of the present invention is not limited to magnetic jacking type control element drives, the preferred form of the linear drive devices. For instance, rack and pinion drive devices or other types of drives to be developed in the future could be used in place of magnetic jacking type drives.

Figure 2:
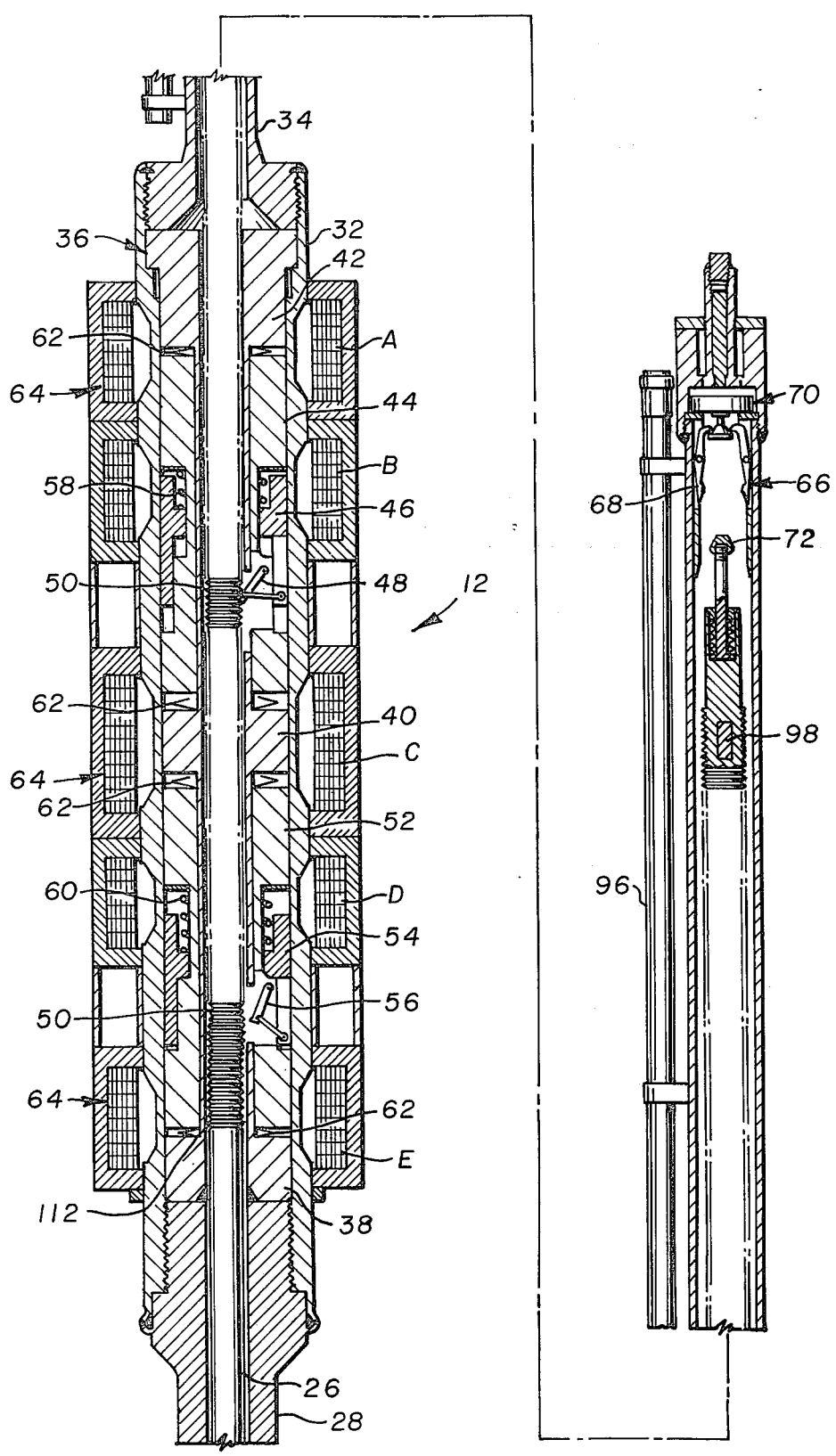
FIG. 2 is a sectional side elevation of a magnetic jack type drive device incorporating the present invention, the control element drive extension being held by the first type of holding means.

Turning now to a more specific description of the magnetic jack of the present invention and its operation in accordance with the present invention, FIG. 2 shows a magnetic jacking type linear drive device 12 having conventional magnetic jack components and further including a second type of independent, distinct holding means. Referring first to the conventional aspects, the magnetic jack 12 includes a cylindrical or tubular housing 32 within which the control element drive extension 26 is axially disposed such that it may be vertically adjusted. The housing 32 effectively provides a hermetic seal for the drive extension or shaft 26 with the housing 32 being secured at its lower end to the nozzle 28 extending out of the pressure vessel head 14. The upper end of the housing 32 is sealed by means of an extension 34 as is well known in the art. Within the housing 32, means for moving and for holding the control element drive extension 26 are provided which may be of any well known form. By way of example, there is fixedly secured within the housing 32 a sleeve 36 which is provided with a pair of outwardly directed recesses, as shown, so as to form on the sleeve a lower land 38, a central land 40 and an upper land 42. These lands effectively act as stops for the slugs or armatures received within the recesses. Positioned in the upper recess is a slug or armature 44 which is movable intermediate the central and upper lands 40, 42 and received within an outwardly directed recess provided in this armature 44 is a gripper actuating slug or armature 46. This latter armature 46 is effective to operate a latch or gripper 48 which is movable into and out of engagement with projections or teeth 50 formed on the drive extension 26. The lower recess in the sleeve 36 has a similar pair of armatures identified as 52 and 54 with the armature 54 operating the lower latch or gripper 56. Each of the gripper actuating armatures 46, 54 are biased to their lowermost non-latching position by means of springs 58 and 60 respectively. Buffer springs 62 are provided at each end of each armature 44, 52 to reduce the impact loads on the lands of the sleeve 36.

Actuation of the various armatures is achieved by means of a solenoid coils, generally 64, snugly disposed about the housing 32. In the illustrative embodiment five coils 64 are employed and identified as A, B, C, D and E.

The operation of this device 12, as is well known, is such that upon energization of the coils 64 in their proper sequence the drive extension 26 moves either upwardly or downwardly in accordance with the desired direction of motion. For example, energization of coil A will cause the armature 44 to move to its upper position while energization of coil B will cause the gripper actuating armature 46 to move to its upper position and thereby cause the gripper 48 to engage the teeth 50 on the drive extension 26. Energization of coil C will cause the upper armature 44 to move to its lower position and the lower armature 52 to move to its upper position, while energization of coil D will cause the gripper actuating armature 54 to move to its upper position and thereby cause the lower gripper 56 to engage the drive extension 26. Energization of coil E will cause the armature 52 to move to its lower position. Assuming that the desired movement of the drive extension 26 is upward and that the upper armature 44 is in its lower position and the lower armature 52 in its upper position, the following sequence of operation will take place: Coil B will be energized so as to engage the upper gripper 48 with the drive extension 26 and coil D de-energized to release the lower gripper 56, coil C will then be de-energized, coil A energized to raise armature 44 and at the same time coil E energized to lower armature 52, thereafter coil D will be energized to engage the lower gripper 56 and coil B de-energized to release the upper gripper 48 after which coils A and E will be de-energized and coil C energized to raise armature 52 and lower armature 44. The above procedure may then be repeated to effectuate further upward step-wise movement of the control element drive extension 26. For downward step-wise movement, a reverse sequence of operation would be provided.

In accordance with the present invention, there is provided a second type of holding means 66 at the upper end of the pressure housing extension 34 for holding the control elements 16 in a raised position. As more fully described herein below, the second holding means 66 is comprised of different components and operates in a distinct or dissimilar manner than the first holding means (i.e. the grippers 48, 56 and coils 64 of the magnetic jack 12) in order to minimize common mode failure problems. Furthermore, the second holding means is independent and operates independently on the first holding means. Further still it is preferable that the second holding means 66 be operative in such a manner that disengagement of the first holding means (i.e. the grippers 48, 56) from the control element extension 26 may be detected.

Accordingly, this second holding means, generaly 66 of the present invention comprises a plurality of elongated latching fingers 68 (only 2 shown), actuator means 70 for moving the latching fingers into an engaging position, and a coupling head 72 on the upper end of the control element drive extension 26 which is adapted to be engaged by the latching fingers 68. As best seen in FIG. 3, the latching fingers 68 are received within recesses provided in a support sleeve 74 supported within the upper end of the pressure housing extension 34 and are pivotally mounted thereat intermediate therein by means of pins 76. Each of the latching fingers 68 has a lower, inwardly extending portion 78 formed to provide upper and lower camming surfaces 80 and 82 respectively. It is on the upper camming surfaces 80 which the coupling head 72 rests when the control element 16 is held in a raised position by the second holding means 66. (See FIG. 4)

The actuator means 70 for moving the latching fingers 68 into an engaging or holding position comprises a camming actuator head 84 supported from the lower end of a magnetic armature or slug 86. The armature 86 is mounted for limited vertical movement within a recess in the upper pressure housing closure member 88, which movement is effected by means of a magnetic actuating coil 90 removably housed within the housing closure member 88. Energization of the actuator coil 90 forms a magnetic field which acts to draw the armature 86 upwardly which in turn causes the camming actuator head 84 to be moved upwardly relative to the latching fingers 68. The camming actuator head 84 has a conical camming surface 92 formed thereon which is adapted to engage inardly protruding extensions 94 at the upper end of the latching fingers 68. As best seen in FIGS. 3 and 4, upward movement of the camming actuator head 84 acts to pivot the latching fingers 68 into an engaging position by forcing the upper ends of the fingers 68 outward to move the lower ends inward. When the latching fingers 68 are in this engaging position, the lower surface of the coupling head 72 rests on or is engaged by the upper camming surfaces 80 on the lower portions 78 of the latching fingers 68. As can be appreciated, upon de-energization of the actuating coil 90, the magnetic armature 86 and camming actuator head 84 move downwardly under the influence of gravity to release the camming force applied by the camming actuator head 84 and thereby permit movement of the latching fingers 68. When this occurs, the weight of the drive extension 26 will cause the coupling head 72 acting against the upper camming surfaces 80, to pivot the lower ends of the latching fingers 68 outwardly to release the control element drive extension 26 and permit it to fall freely to insert the control element into the nuclear core. That is, when the camming actuator head 84 is in its lower position, the coupling head 72 on the drive extension 26 will cam the latching fingers 68 out of engagement therewith. Similarly, when the actuator means 70 is de-actuated and the control element drive extension 26 is being moved upwardly within the pressure housing 32, the upper surface of the coupling head 72 may engage the lower camming surfaces 82 of the latching fingers 68 to pivot the lower ends of the fingers 68 outwardly to permit free upward travel of the drive extension 26 to a position above its engaging position with the latching finger 68.

Operation to increase reliability to scram of the above described magnetic jack drive mechanisms 12 of the nuclear reactor 10 in accordance with the present invention is as follows. The longitudinal position of each of the control elements 16 in the nuclear reactor 10 is controlled and regulated by proper sequential energization and de-energization of the magnetic coils A, B, C, D and E of each of the drive devices 12 in accordance with heretofore normal operation. For example, scramming type control elements are initially raised to a withdrawn position, such as shown in FIG. 2, and regulating type control elements are raised and lowered in accordance with the desired output of the nuclear core 20. These operations are all accomplished by engaging, raising or lowering, and disengaging the grippers 48, 56 to effect step-wise movement of the control element extension 34. In the preferred embodiment then, a portion of the withdrawn scramming type control elements 16 are maintained in their withdrawn position by leaving at least one gripper 48 or 56 of the associated drive mechanisms 12 engaged with the teeth 50 on the drive extension 34, this being the heretofore normal procedure for all scramming type control elements. For the remaining portion of the scramming type control element 16 however, the grippers 48, 56 and magnetic coils 64 of the associated drive mechanisms 12 are operated to further raise the drive extensions 26 to a longitudinal position or elevation above the elevation of engagement of the second holding means 66. As shown in FIG. 3, during this raising operation the camming actuator head 84 is in its lowered position and the lower ends of the latching fingers 68 pivoted outward, for example, as a result of the coupling head 72 engaging the lower camming surfaces 82, to permit free passage upward of the coupling head 72 to a position above the lower ends of the latching fingers 68. When the drive extensions 26 are in this raised position, the actuating coils 90 of the respective drive mechanisms 12 are then energized to pull the armature 86 upward and thereby raise the camming actuator head 84 to pivot the lower end of the latching fingers 68 inward into an engaging position (see the latching finger position in FIG. 4). The first holding means is then disengaged from the control element drive extension 26 and the drive extension 26 allowed to fall downwardly a short distance whereupon the latching fingers 68 engage the coupling head 72 to hold the control element 16 in a raised or withdrawn position. Disengagement of the first holding means is accomplished by de-energization of each of the magnetic coils A, B, C, D, and E of the respective linear drive devices 12 such as in heretofore normally done to scram control elements.

In the preferred embodiment means 96 are provided for detecting this limited downward movement of the drive extension 26 upon disengagement of the first holding means therefrom to positively indicate disengagement of the first holding means and holding engagement by the second holding means 66. Preferably the detection means 96 comprises a reed switch position indicator mounted adjacent the upper pressure housing extension 34 and having a plurality of longitudinally arranged reed switches (not shown) which are adapted to be actuated by a magnet 98 mounted within the upper end of the drive extension 26 (see FIG. 2). As the drive extension 26 moves downwardly, the magnet 98 activates the reed switches to indicate movement of the drive extension. Such movement positively indicates disengagement of the first holding means since, as can be appreciated, such movement is only possible if the first holding means (i.e. the grippers 48 and 56) are both disengaged from the drive extension 26. A positive indication that the second holding means 66 is in its engaged position and in fact is holding the control element 16 in a raised position is achieved by detecting that the control element drive extension 26 has stopped its downward movement. The reed switch position indicator 96 in the preferred embodiment is of a conventional design commonly known and often used with magnetic jacks in the past for indicating the longitudinal position of control elements with respect to the nuclear core.

Also in the preferred embodiment, as can be seen in FIGS. 3 and 4, a buffer assembly or shock dampener 100 is provided at the upper end of the drive extension 26 for buffering or dampening shock experienced by the drive extension 26 when the coupling head 72 falls into engagement with the latching fingers 68. The shock dampener 100 comprises a bellows springs 102 housed within a cylindrical opening in the upper end of the drive extension 26 between the flanged end of an upper post 104 and a retaining collar 106 threadably connected to the upper end of the drive extension 26. The post 104 extends upwardly through an opening in the retaining collar 106 and supports the coupling head 72 of the second holding means 66.

Scramming of control element 16 held in a raised or withdrawn position by the second holding means 66 is accomplished by de-energization of the magnetic coil 90. This will allow the magnetic armature 86, and thus the camming actuator head 84 to fall to release the force pivoting the lower ends of the latching fingers 68 inwardly. The weight of the control element drive extension 26 will then cause the coupling head 72 to cam the lower ends of the latching fingers 68 outward whereupon the drive extension 26 will fall freely within the pressure housing 32. Should the magnetic armature 86 or the latching fingers 68 become jammed, the weight of the drive extension 26 is sufficient to pivot the latching fingers 68 and thus cause the upper ends of the fingers 68 to act on a camming surface 92 of the actuator head 84 to force the armature 87 and head 84 downward.

As is conventional with heretofore standard magnetic jacks, de-energization of the magnetic actuator coil 90 and also de-energization of the coils 64, is accomplished by means of a plurality of independent and redundant control logic circuits which act to cut the energizing electrical current to the magnetic coils 64, 90 in the event of a situation calling for scramming of the control elements 16. Such scramming control systems are conventional with respect to nuclear reactors and have proven highly reliable heretofore since postulated accident situations calling for scramming or shutdown of the reactor which might effect operation of the linear drive devices would, at the worst, not only cause an interruption of the electrical current to the coils and thus cause de-energization of the coils to release the control element drive extensions 26.

Means (not shown) may also be provided for manually or mechanically holding the armature 86 in a raised position so as to place the latching fingers 68 in an engaging position. This is particularly useful where it is desired to remove the reactor vessel head 14 and maintain the control element drive extensions 26 within the linear drive devices 12 during refueling of the reactor. For this purpose the nut 108 and bolt 110 of the upper pressure housing closure member 88 are removed after the magnetic coil 90 is energized to hold the armature 86 in its raised position and an appropriate tool (not shown) may then be inserted through the opening in the closure 88 and threaded into the upper surface of the armature 86. The tool would then hold the armature 86 up when the coil 90 is de-energized to maintain the fingers 68 in their engaging position. The nut 108 and bolt 110 also serve to vent gases which may be trapped in the housing 32 during refueling when the reactor vessel head 14 is replaced in position on top of the reactor vessel 10, such an arrangement being well known in the art.

As can be appeciated, the linear drive devices 12 and method of operation in accordance with the present invention will increase the reliability to scram some of the control elements 16 into the reactor core 20. The components and manner of operation for each of the two types of holding means of the linear drive devices 12 are distinct and dissimilar from one another. For example, the first holding means comprises (reference will only be made to the upper gripper 48 and associated components, the components and operation for the lower gripper 56 being similar) to movable slugs 44, 46 and a two-link gripper 48 having three pivotal joints while the second holding means comprises a single armature 86 and single, elongated, pivotally mounted latching fingers 68. Also, operation of the first holding means involves sliding movement of the slugs 44, 46 to rotate the links of the gripper 48 to move the gripper 48 into engagement with the longitudinal surfaces of the drive extension 26. On the other hand, the operation of the second holding means 66 merely involves longitudinal movement of the armature 86 to effect a camming action of the single lever, elongated latching fingers 68. Furthermore, movement of the magnetic armature 86 in the large recess at the upper end of the pressure housing extension 34 is different from the movement of the slugs 44, 46 in slots in the side of the pressure housing 32 for the first holding means. Further still, the latching fingers 68 of the second holding means are movable into an engaging position to engage a coupling head 72 on one end of the drive extension 26 whereas the gripper 48 of the first holding means, when moved into engagement, is in a position to engage the longitudinal surface of the drive extension 26 during its entire length of travel. There are only a few of the differences between the components and method of operation of the two holding means of the linear drive devices 12 of the present invention. Additionally, if a greater degree of distinctness is desired, a different, non-magnetic actuator means 70 could be employed.

It is these differences which act to minimize the probability that a single event will cause failure of all of the linear drive devices 12 to function properly so as to be able to scram control elements 16 into the nuclear core 20. That is, since only a portion of the scramming type control elements are held in a withdrawn position within the linear drive devices 12 by each of the two types of holding means, and since the two types of holding means are different from one another and operate in different manners, the probability of a common mode failure of both types of holding means is minimized. In the preferred embodiment, one half of the scramming type control elements are held by the first type of holding means and the other half are held by the second type of holding means. Insurance that only one holding means will be operative at any one time for each of the linear drive devices 12 is achieved by the fact that means 96 are provided for positively detecting disengagement of the first type of holding means and engagement of the second type of holding means for those control elements which are to be held by the second type of holding means. For the linear drive devices 12 which are operative to use only the first type of holding means, upward movement of the control element drive extension 26 may be limited by an appropriate means (not shown) so that those drive extensions 26 will never move into or above the engaging elevation of the second holding means. Also, it should be noted that for those control elements 16 which are to be held by the second holding means 66, upward movement of the drive extension 26 may be limited by only providing enough teeth or projections 50 thereon at the lower end so that the lower gripper 56 engages the last projection 112 (See FIG. 2) on the drive extension 26 when the coupling head 72 is in its uppermost position as shown in FIG. 3.

It is to be noted that failure of either type of holding means of the linear drive devices 12 as the result of a common mode failure to that type of holding means will not affect operation of the other type of holding means due to th dissimilarity in components and manner of operation. Also operation of the linear drive devices in the manner described hereinabove insures that only one type of holding means can be operative to hold the control elements in a withdrawn position at any one time. This assures that the increase in reliability to scram achieved by providing a second type of holding means will be realized.

Further, it is to be noted that use and practice of the present invention is not limited to use of the second holding means 66 disclosed herein for use in conjunction with magnetic jacking type drive mechanisms. Instead different types of holding means may be used in place of the second holding means 66. This may prove to be advantageous should the present invention be practiced with different types of linear drive mechanisms. Also the present invention is not limited to use only with shutdown type control elements as two types of different holding means could be employed for holding regulating type control elements during normal reactor operation. In this situation, the second type of holding means would act to hold a portion of the plurality of regulating control elements and would also include means for moving the second type of holding means to regulate the power output of the nuclear core 20 during normal reactor operation. Operation to insure release of the first holding means and engagement of the second holding means and drive could then be accomplished in a similar manner as that disclosed herein for shutdown type control elements.

While a preferred embodiment of the invention has been shown and described, it will be understood that such is merely illustrative and that changes may be made without departing from the scope of the invention. What is sought to be protected herein is that which is recited in the appended claims.

What is claimed is:

1. A method of increasing reliability of a portion of control elements to scram in a nuclear reactor when the control elements are held in a raised position by linear drive devices associated therewith, the method comprising:

providing each of said linear drive devices with a first holding means actuable to hold said control elements associated therewith in a raised position and deactuable to release said control elements from holding engagement thereby;

providing each of said linear drive devices with a second holding means actuable to hold said control elements in a raised position and deactuable to release said control elements from holding engagement thereby, each of said second holding means being dissimilar and operatively dissimilar from said first holding means;

operating a first portion of said linear drive devices to hold said control elements in a raised position only by said first holding means; and operating the remaining portion of said linear drive devices to hold said control elements in a raised position only by said second holding means.

2. A method of increasing reliability of a portion of control elements in a nuclear reactor to scram when the control elements are normally held in a raised position by linear drive devices associated therewith, the method comprising:

providing each of said linear drive devices with a first holding means for holding said control elements in a first raised position, said first holding means being operative to release said control elements held thereby in the event of situation calling for a scram;

providing each of said linear drive devices with a second holding means for holding said control elements in a second raised position, said second holding means being operative to release said control elements held thereby in the event of a situation calling for a scram, each of said holding means being dissimilar from and operatively dissimilar from said first holding means;

holding said control elements associated with a first portion of said plurality of linear drive devices in said first raised position with said first holding means during normal reactor operation; and holding said control elements associated with the remaining portion of said plurality of said linear drive devices in said second raised position with said second holding means during normal reactor operation.

3. The method of claim 2 comprising the additional steps after said providing steps of:

actuating all of said first holding means on said plurality of linear drive devices to hold said control elements in said first raised position;

raising said first holding means of a said remaining portion of said plurality of linear drive devices;

actuating said second holding means on said remaining portion of said plurality of linear drive devices;

deactuating said first holding means on said remaining portion of said plurality of linear drive devices to release said control elements held thereby, whereby said control elements instead will be held by said second holding means of said remaining portion of said plurality of linear drive devices; and positively detecting disengagement of said first holding means of said remaining portion of said plurality of linear drive devices and detecting engagement of said second holding means of said remaining portion of said linear drive devices.

4. The method of claim 3 wherein the step of raising said first holding means of said remaining portion of said plurality of said linear drive devices comprises raising said first holding means of said remaining portion to raise said control elements held thereby to a position above said second raised position; wherein the step of actuating said second holding means of said remaining portion of said linear drive devices comprises moving said second holding means into an engaging position; and wherein the step of detecting comprises detecting movement of said control element upon disengagement in said first holding means prior to its arrest upon engagement by said second holding means.

5. A method of increasing the reliability of a portion of control elements in a nuclear reactor to scram into the core of the nuclear reactor, the control elements being normally held in a raised position by a plurality of linear drive devices each of which has means for longitudinally moving the control elements and first holding means for engaging extensions of said control elements to hold said control elements in a first raised position, said first holding means being deactuable to release the extensions to allow the control elements to scram, the method comprising: mounting a second holding means on each of said linear drive devices, each of said second holding means being independent of said moving means and said first holding means and being actuable to engage the extension of said control element associated with said linear drive device for holding said control element in a second raised position and being deactuable to release said extension to allow said control element to scram, said second holding means being dissimilar and operatively dissimilar from said first holding means so as not to be subject to the same common mode failure;

raising said extensions of said control elements and holding said extensions in said first raised position with said first holding means for each of said linear drive devices during normal reactor operation;

actuating said second holding means of only a first portion of the plurality of linear drive devices of the nuclear reactor;

deactuating said first holding means of said linear drive devices of said first portion of said plurality of linear drive devices;

and detecting release of said first holding means from said extensions of said first portion of said plurality of linear drive devices and detecting engagement of said second holding means with said extensions of said first portion of said plurality of linear drive devices.

6. The method of claim 5 in which said second raised position is longitudially above said first raised position and, further including the step before actuating said second holding means on said first portion of said plurality of linear drive devices of: raising said extensions held by said first holding means of said first portion of said linear drive devices to a longitudinal position above said second raised position at which said second holding means is engageable whereby the drive extensions of said first portion of said linear drive devices will fall upon deactuation and release by said first holding means into engagement with said second holding means.

7. The method of claim 6 wherein the step of detecting release by said first holding means and engagement by said second holding means of said first portion of said linear drive devices comprises detecting limited movement longitudinally of said extensions which is equivalent to movement from said longitudinal position to said second raised position.

8. A method of operating a plurality of linear drive devices of a nuclear reactor for scramming control elements held in a raised position thereby, the linear drive devices each having two dissimilar and operatively distinct holding means each of which is operative to hold extensions of the control elements in a raised position and each of which is operative to release the extensions when deactuated, the method comprising:
  holding the extensions of only a first portion of the plurality of linear drive devices with said first means, said second means of said first portion of linear drive devices being deactuated;
  holding the drive extensions of the remaining portion of said plurality of linear drive devices with said second holding means, said first holding means of said second portion being deactuated;
  and deactuating all of said first holding means and said second holding means which are actuated in the event of a condition calling for scramming of the control elements into the nuclear reactor.

9. A method of operating a plurality of linear drive devices which control the longitudinal position of control elements in a nuclear reactor for insuring reliability to scram a portion of the control elements when they are held in a raised position in the event of a situation dictating a scram, the linear drive devices each having moving means for raising and lowering the control elements, a first holding means associated with the moving means which is actuable to engage the control element and deactuable to release the control element engaged thereby, a second holding means independent of said first holding means and being dissimilar and operatively distinct from said first holding means, the second holding means being actuable to engage the control element and being deactuable to release the control element held thereby, the method comprising:
  actuating said moving means and said first holding means to raise the control element and hold it in a first raised position for each of said plurality of linear drive devices;
  actuating said second holding means of only a first portion of said plurality of linear drive devices;
  deactuating said first holding means of said first portion of said plurality of linear drive devices to release said control elements from engagement therewith;
  detecting deactuation of said first holding means and release of said control elements held thereby of said first portion of said plurality of linear drive devices; detecting holding of said control elements by said second holding means of said first portion of said plurality of linear drive devices;
  and deactuating said first holding means and said second holding means of said linear drive devices in the event of a scram situation in said nuclear reactor.

10. The method of claim 9 in which said holding means of each of said plurality of linear drive devices is operable to engage said control elements when said control elements are in a second raised position, and further including, prior to the step of actuating said holding means of said first portion of said plurality of linear drive devices, the step of: raising said control elements associated with said first portion of said plurality of linear drive devices to a longitudinal position longitudinally above said second raised position of said control elements at which said second holding means is operative to hold said control elements whereby said first holding means is deactuated after said second holding means is actuated, said control elements will fall into holding engagement by said second holding means.

11. The method of claim 10 wherein the step of detecting disengagement of said first holding means comprises detecting movement of said control element downward.

12. The method of claim 11 wherein the step of detecting engagement of said second holding means comprises detecting only limited movement of said control element after disengagement of said first holding means, the amount of limited movement being equivalent to approximately the longitudinal distance between said longitudinal position and said second raised position.

13. The method of claim 12 in which said second raised position of said control elements is a longitudinal position when said control elements are fully withdrawn from said nuclear core and wherein the step of actuating said second holding means on only said first portion of said linear drive devices comprises actuating said second holding means on only that portion of said linear drive devices in which the control elements are to be maintained fully withdrawn from said core during normal reactor operation.

14. In a magnetic jacking type control element drive assembly having a housing, a control element extension within said housing having a plurality of axially spaced teeth thereon, first engaging means adapted to be moved into and out of engagement with said teeth on said control element extension, and first moving means for moving said first engaging means into an out of engagement with said teeth on said control element extension and for moving said first engaging means longitudinally within said housing to effect stepwise linear motion of said control element extension, said first moving means being adapted to move said first engaging means out of engagement with said teeth on said control element extension in the event of a scram situation to release said control element extension, the improvement comprising: a second holding means for holding said control element extension in a raised position within said housing, said second holding means being mounted on said housing and being independent and different from said first engaging means and said first moving means, said second holding means being operative when in an actuated state to hold said control element extension at least when said first engaging means is out of engagement with said teeth on said control element extension and when in a deactuated state to release said control element extension to permit it to freely fall within said housing, said second holding means being deactuable in the event of a scram situation.

15. The magnetic jacking type control element drive assembly of claim 14 wherein said second holding means is mounted on said housing at the upper end thereof for holding said control element extension in its fully raised position.

16. The magnetic jacking type control element drive assembly of claim 15 wherein said second holding means comprises: second means for engaging said control element extension, said second engaging means being movable into and out of an engaging position and being positioned within said housing so as to engage said control element extension when said control element extension is at a first longitudinal position; second moving means for moving said second engaging means into an engaging position and for holding said second engaging means thereat; and means for moving said second engaging means out of said engaging position to release said control element extension held thereby in a scram situation; and wherein said first moving means is operative to move said control element extension longitudinally within said housing to a second longitudinal position above said first longitudinal position whereby when said first engaging means is moved out of engagement with said teeth on said extension and said second engaging means is moved into position to engage said extension, said control element extension will fall within said housing into engagement with said second engaging means at said first longitudinal position.

17. The magnetic jacking type control element drive assembly of claim 16 wherein said second engaging means comprises a plurality of longitudinally extending latching fingers pivotally mounted intermediate of its end within said housing; and wherein said means for moving said latching fingers into said engaging position comprises a magnetic armature slidably mounted within said housing and having a camming actuator mounted thereto, a magnetic coil mounted within said housing having a magnetic field for raising said magnetic armature mounted within said housing, and camming surfaces on said camming actuator which are adapted to engage camming surfaces on the upper ends of said latching fingers whereby when said magnetic armature is raised within said housing, said camming actuator pivots the upper ends of said latching finger outwards to pivot the lower ends thereof inwards into said engaging position.

18. The magnetic jacking type control element drive assembly of claim 17 wherein said means for moving said latching fingers out of said engaging position comprises camming surfaces on the lower ends of said latching fingers, a head member mounted to said control element extension having camming surfaces on the lower surface thereof adapted to engage said camming surfaces on the lower ends of said latching fingers when said control element extension is held in by said latching fingers, and means for extinguishing said magnetic field of said magnetic coil to permit said camming actuator to fall, the weight of said control element extension acting to cam said latching fingers out of engagement with said head member.

19. The magnetic jacking type control element drive assembly of claim 18 further including a buffering element on said control element extension to dampen the shock on said control element extension when said control element extension is dropped from said second longitudinal engaging position to said first longitudinal position into engagement with said latching fingers.

* * * * *

UNITED STATES PATENT OFFICE
CERTIFICATE OF CORRECTION

PATENT NO. : 3,959,071
DATED : May 25, 1976
INVENTOR(S) : Frank Bevilacqua

It is certified that error appears in the above-identified patent and that said Letters Patent are hereby corrected as shown below:

Column 2, line 23, change "a" following "system" to --of--.
Column 6, line 9, change "generaly" to --generally--;
Column 6, line 41, change "inardly" to --inwardly--.
Column 7, line 15, insert --reactor-- after "normal";
Column 7, line 58, change "in" to --is--.
Column 8, line 51, change "87" to --86--;
Column 8, line 56, change "pluraity" to --plurality--;
Column 8, line 65, delete "not".
Column 9, line 55, change "There" to --These--.
Column 10, line 33, change "th" to --the--.
Column 11, line 42, insert --second-- after "said";
Column 11, line 68, change "pluraity" to --plurality--.
Column 12, line 53, change "pluraity" to --plurality--;
Column 12, line 59, change "longitudially" to --longitudinally--.
Column 13, line 66, insert --second-- after "said".
Column 14, line 9, insert --when-- after "whereby".

Signed and Sealed this

Nineteenth Day of April 1977

[SEAL]

Attest:

RUTH C. MASON
Attesting Officer

C. MARSHALL DANN
Commissioner of Patents and Trademarks